United States Patent
Dwelley et al.

(10) Patent No.: US 9,660,456 B2
(45) Date of Patent: May 23, 2017

(54) SWITCHING OF CONDUCTOR PAIR IN POWER OVER ETHERNET SYSTEM

(71) Applicant: LINEAR TECHNOLOGY CORPORATION, Milpitas, CA (US)

(72) Inventors: David McLean Dwelley, Santa Barbara, CA (US); Jeffrey Lynn Heath, Santa Barbara, CA (US)

(73) Assignee: LINEAR TECHNOLOGY CORPORATION, Milpitas, CA (US)

( * ) Notice: Subject to any disclaimer, the term of this patent is extended or adjusted under 35 U.S.C. 154(b) by 644 days.

(21) Appl. No.: 13/657,412

(22) Filed: Oct. 22, 2012

(65) Prior Publication Data
US 2013/0113275 A1    May 9, 2013

Related U.S. Application Data

(60) Provisional application No. 61/550,655, filed on Oct. 24, 2011.

(51) Int. Cl.
| | | |
|---|---|---|
| H02J 4/00 | (2006.01) | |
| H04L 12/10 | (2006.01) | |
| H04L 12/40 | (2006.01) | |

(52) U.S. Cl.
CPC ............... *H02J 4/00* (2013.01); *H04L 12/10* (2013.01); *H04L 12/40045* (2013.01)

(58) Field of Classification Search
CPC ...... H02J 4/00; H04L 12/10; H04L 12/40045; H04L 5/0096; G06F 1/26; H02H 11/002;
(Continued)

(56) References Cited

U.S. PATENT DOCUMENTS

| 7,777,636 B2 * | 8/2010 | Diab ................. G01K 7/00 340/657 |
| 8,035,399 B2 * | 10/2011 | Diab ................. H04L 12/10 324/539 |

(Continued)

FOREIGN PATENT DOCUMENTS

| GB | 2448971 A | * 11/2008 | ............. H04L 12/10 |
| WO | 2007121150 A2 | 10/2007 | |

OTHER PUBLICATIONS

Extended European Search Report issued in European Application No. 12007313.5 dated Feb. 26, 2013.
State Intellectual Property Office of the People's Republic of China. 2015. Notification of the First Office Action and Office Action, issued Jun. 5, 2015 for corresponding China Application No. 201210410477.8, entitled "Switching of Conductor Pair in Power Over Ethernet System," filed Oct. 24, 2012.
(Continued)

*Primary Examiner* — Rexford Barnie
*Assistant Examiner* — Elim Ortiz
(74) *Attorney, Agent, or Firm* — McDermott Will & Emery LLP

(57) ABSTRACT

Technique for providing power to a powered device (PD) over a cable having first and second sets of twisted pairs, such as signal pairs and spare pairs. Power Sourcing Equipment (PSE) circuitry is coupled via a first switch to the second set, e.g. to the spare pairs. A switch control circuit turns the first switch off to enable the PSE circuitry to perform a prescribed operation in connection with the PD over only the first set, e.g. over the signal pairs, and turns the first switch on to enable the PSE circuitry to perform the prescribed operation in connection with the PD over the first and second sets.

16 Claims, 5 Drawing Sheets

(58) Field of Classification Search
CPC .. H04W 72/005; H04W 48/12; H04W 72/042
USPC .............................................. 307/1; 713/300
See application file for complete search history.

(56) References Cited

U.S. PATENT DOCUMENTS

| | | | | |
|---|---|---|---|---|
| 8,565,111 | B2* | 10/2013 | Diab | H04L 12/10 370/252 |
| 8,571,535 | B1* | 10/2013 | Lin | H04L 61/2015 455/414.1 |
| 8,716,886 | B2* | 5/2014 | Landry | H03K 17/0822 307/35 |
| 2006/0112288 | A1* | 5/2006 | Schindler | G06F 1/266 713/300 |
| 2007/0283173 | A1* | 12/2007 | Webb | G06F 1/305 713/300 |
| 2009/0088908 | A1* | 4/2009 | Karam | H04L 12/10 700/297 |

OTHER PUBLICATIONS

State Intellectual Property Office of the People's Republic of China. 2015. Notification of the Second Office Action, issued Jan. 18, 2016, for corresponding China Application No. 201210410477.8, entitled "Switching of Conductor Pair in Power Over Ethernet System," filed Oct. 24, 2012.

European Patent Office. 2016. Communication Pursuant to Article 94(3) EPC for corresponding European Application No. 12007313.5, entitled "Switching of Conductor Pair in Power Over Ethernet System," filed Oct. 24, 2012, published as EP 2587718 A1.

Official Action issued on Sep. 13, 2016 in related Japanese Application No. 2012-233880 with English lanuage translation.

Decision of Rejection issued Aug. 30, 2016 in related Chinese Patent Application No. 201210410477.8 with English language translation.

European Patent Office. 2015. Communication Pursuant to Article 94(3) EPC (examination report), dated Sep. 4, 2015, regarding European Application No. 12007313.5, entitled "Switching of Conductor Pair in Power Over Ethernet System," European counterpart to instant application.

* cited by examiner

SWITCHING OF CONDUCTOR PAIR IN POWER OVER ETHERNET SYSTEM

This application claims priority of the U.S. provisional patent application No. 61/550,655 filed on Oct. 24, 2011, the entire disclosure of which is incorporated herewith by reference.

TECHNICAL FIELD

This disclosure relates to power supply systems, and more particularly, to a Power over Ethernet (PoE) system which uses four pairs of conductors for providing power.

BACKGROUND ART

In the PoE system defined in the IEEE standard, Power Sourcing Equipment (PSE) provides power to a Powered Device (PD) over a CAT-5 cable having two sets of twisted pairs. The first set includes two "signal" pairs of conductors, and the second set includes two "spare" pairs of conductors. PoE systems typically supply power from the PSE to the PD over one set of pairs in a CAT-5 cable—either the "signal" pairs or the "spare" pairs. Some higher power PoE systems provide power on all four pairs of conductors simultaneously.

For example, as shown in FIG. 1, the LTPoE++™ system provides power by tying the signal and spare pair center taps together. This system includes PSE circuitry 12 coupled to output circuitry composed of a signal pair power line 14, a spare pair power line 16, a signal pair return line 18 and a spare pair return line 20. The signal pair power line 14 is connected to the spare pair line 16, whereas the signal pair return line 18 is connected to the spare pair return line 20.

As illustrated in FIG. 2, each of the lines 14, 16, 18 and 20 is connected via the center tap of a respective Ethernet transformer to a respective pair of conductors in an Ethernet cable having four pairs of conductors—two signal pairs and two spare pairs. In particular, the signal pair power line 14 and the signal return line 18 are connected to the signal pairs 22 and 24 of the Ethernet cable, and the spare pair power line 16 and the spare pair return line 20 are connected the spare pairs 26 and 28 of the Ethernet cable. The Ethernet transformers connect the conductor pairs to the Ethernet PHY.

By contrast with the system in FIG. 1, the Cisco Universal Power over Ethernet (UPoE) system uses two PSE channels, one for the signal pairs and one for the spare pairs. As shown in FIG. 3, the UPoE system includes separate PSE circuitries 120 and 140. The PSE circuitry 120 provides power over the signal pair power line 14 and the signal pair return line 18, whereas the PSE circuitry 140 supplies power over the spare pair power line 16 and the spare pair return line 20. The spare pair return line 20 is connected to the signal pair return line 18.

These two techniques for high power delivery are not interoperable with each other if standard IEEE detection and classification schemes are used. Therefore, there is a need for a new technique that would provide interoperability among different high power PoE systems.

SUMMARY OF THE DISCLOSURE

In accordance with one aspect, the present disclosure offers a system for providing power to a powered device (PD) over a cable having first and second sets of twisted pairs, such as a set of signal pairs and a set of spare pairs. The system has Power Sourcing Equipment (PSE) circuitry, and a first switch for coupling the PSE circuitry to the second set, e.g. to the set of spare pairs. A switch control circuit turns the first switch off to enable the PSE circuitry to perform a prescribed operation in connection with the PD over only the first set, e.g. over the set of signal pairs, and turns the first switch on to enable the PSE circuitry to perform the prescribed operation in connection with the PD over the first and second sets.

In particular, the first switch may be turned off to enable the PSE circuitry to detect and/or power the PD over only the first set, and the first switch may be turned on to enable the PSE circuitry to detect and/or power the PD over the first and second sets.

The first set may include first and second pairs of conductors in the cable, and the second set may include third and fourth pairs of conductors in the cable.

The PSE circuitry may be configured for providing power over at least a pair of first, second, third and fourth power lines coupled to the first, second, third and fourth pairs of conductors, respectively.

The first switch may be configured for coupling the PSE circuitry to one of the first, second, third and fourth power lines.

For example, the first switch may be turned on after detecting the PD but before providing power to the PD, to enable the PSE to perform detection of the PD over only the first set, and provide power to the detected PD over both the first and second sets.

Also, the first switch may be turned off to enable the PD to provide power from the PSE circuitry over only the first set, and after providing power over the first set, the first switch may be turned on to enable the PD to provide power over both the first and second sets.

In an alternative embodiment, the system may include a second switch for coupling the PSE circuitry to the first set.

The first switch may be turned on and the second switch may be turned off to enable the PSE to detect and/or power the PD over only the second set. The first switch may be turned off and the second switch may be turned on to enable the PSE to detect and/or power the PD over only the first set. Also, both the first and second switches may be turned on to enable the PSE to detect and/or power the PD over both the first and second sets.

In an exemplary embodiment, the first switch and the second switch may be controlled to enable the PSE circuitry to perform a sequence of detection operations to distinguish between a PD associated with a single PD signature circuitry and a PD associated with a pair of PD signature circuitries, or to determine whether a valid PD is coupled to both the first and the second sets.

In accordance with a method of the present disclosure, the first and second switches may be controlled by:

turning the first switch on and the second switch off for performing a first detection operation to detect a PD over only the second set, turning the first switch off and the second switch on for performing a second detection operation to detect the PD over only the first set, and turning the first switch on and the second switch on for performing a third detection operation to detect the PD over both the first and second sets.

If a valid signature value of the PD is detected during each of the first, second and third detection operations, the PD may be considered to be a valid PD connected to the both first and second sets and associated with a single signature circuitry.

If a valid signature value of the PD is detected during each of the first and second detection operations, and the half of the valid signature value is detected during the third detection operation, the PD may be considered to be associated with a pair of signature circuitries.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using specific examples presented below. It will become apparent, however, that the concept of the disclosure is applicable to any PoE system that provides power over four pairs of conductors.

Figure 4:
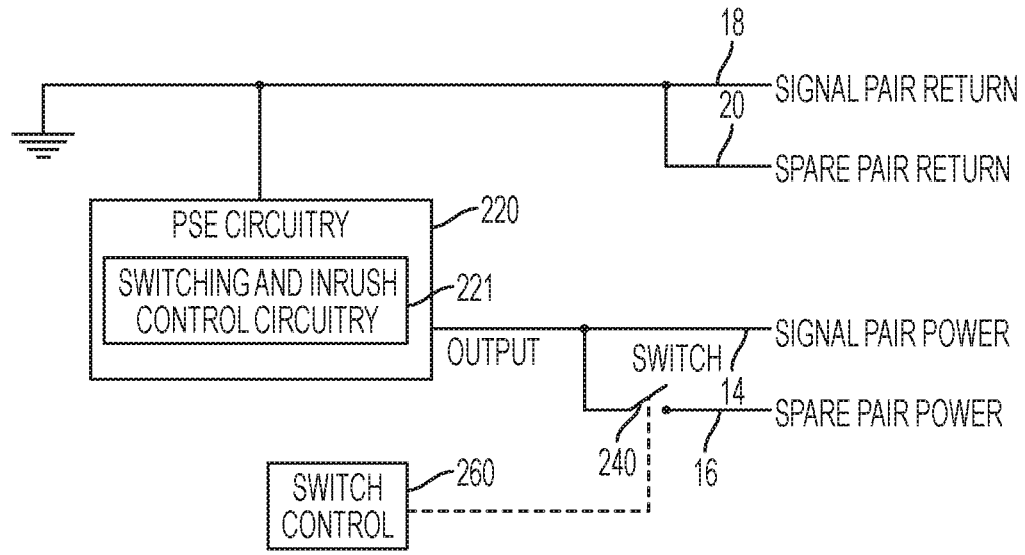
FIG. 4 illustrates an exemplary PoE system of the present disclosure.

FIG. 4 shows an exemplary PoE system of the present disclosure including PSE circuitry 220 coupled to output circuitry having a signal pair power line 14, a spare pair power line 16, a signal pair return line 18 and a spare pair return line 20. The output circuitry is provided for providing power from the PSE circuitry 220 to a PD via an Ethernet cable having four pairs of conductors. The signal pair power line 14, spare pair power line 16, signal pair return line 18 and spare pair return line 20 may be connected to pairs of conductors in the Ethernet cable in a manner illustrated in FIG. 2.

The PSE circuitry 220 is coupled to one of the output lines 14, 16, 18 and 20 via a power switch 240, such as a MOSFET device. For example, the power switch 240 may be provided between the PSE circuitry 220 and the spare pair power line 16. The power switch 240 is controlled by a switch control circuit 260 that may be provided in the PSE circuitry or may be external with respect to the PSE circuitry. The spare pair return line 20 is connected to the signal pair return line 18.

The PSE circuitry 220 may be a PSE device including all circuitries required to perform PSE operations prescribed by the IEEE 802.3 PoE standard. In particular, it may include detection circuitry, optional classification circuitry, and power source circuitry. The PSE circuitry 220 may also include switching and inrush current control circuitry 221.

When the power switch 240 is turned off, the PSE circuitry 220 provides power only to the signal pairs 22 and 24 (FIG. 2), operating as a fully-IEEE compliant PSE. Alternately, when the power switch 240 is turned on, the PSE circuitry 220 supplies power over all four pairs of the Ethernet cable, and therefore, is enabled to provide higher power levels than are possible when the power is provided over two pairs only, or reduce the power loss by lowering the loop resistance compared to providing power over two pairs only.

For example, the power switch 240 may be switched when the power supplied from the PSE circuitry 220 is removed. In this case, when the switch 240 is off, the PSE detection and classification circuits in the PSE circuitry 220 are allowed to perform detection and classification of a PD over two pairs of conductors in the Ethernet cable. When the switch 240 is turned on, the PD may be detected and classified over four pairs of conductors.

The power switch 240 allows the PSE circuitry 220 to perform detection and classification over two pairs, but to apply power over all four pairs. In this case, the switch 240 is turned off during the detection and classification phase, and is turned on after the detection and classification phase.

Switching of the power switch 240 after power from the PSE circuitry 220 is applied to the PD, allows the PSE circuitry 220 to power up the PD either over two pairs of conductors or over four pairs of conductors. For example, if the power to the PD is supplied over two pairs only, the power switch 240 may be turned on to add additional pairs of conductors for providing power. If the power to the PD is supplied over four pairs of conductors, the power switch 240 may be turned off to remove two pairs from a power supply line.

Figure 5:
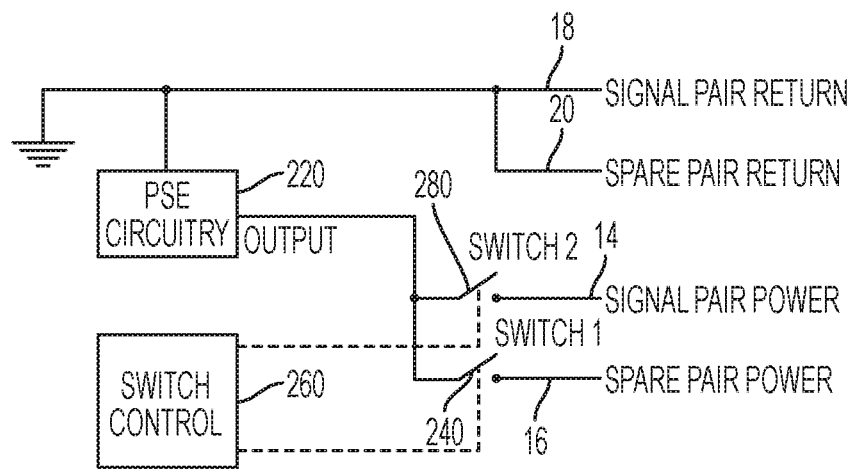
FIG. 5 illustrates an alternative embodiment of the PoE system of the present disclosure.

FIG. 5 illustrates another example of a PoE system in accordance with the present disclosure. The PSE circuitry 220 is connected to the spare pair power line 16 via a first power switch 240, and to the signal pair power line 14 via a second power switch 280. The second power switch 280 operates in the same manner as the first power switch 240, but it allows the PSE circuitry 220 to provide power either to the signal pairs or to the spare pairs when one of the switches is on, and the other is off. When the both switches 240 and 280 are on, the power may be provided to all four pairs together.

This configuration is particularly useful when the switches 240 and 280 are controlled with the PSE power removed, allowing the single PSE to perform PD detection or classification over the signal and spare pairs, either individually or in sequence. This procedure allows the PSE to detect an IEEE PoE detection signature in each pair, which is a distinguishing characteristic of some high-power PDs.

Also, the two-switch scheme in FIG. 5 provides the PSE circuitry 220 with the ability to power up a PD over either set of signal pairs or set of spare pairs and add the other set of pairs after power up. If the PD is powered over all four pairs of conductors, the switches 240 and 280 enable the PSE circuitry 220 to disconnect either set of pairs.

Figure 6:
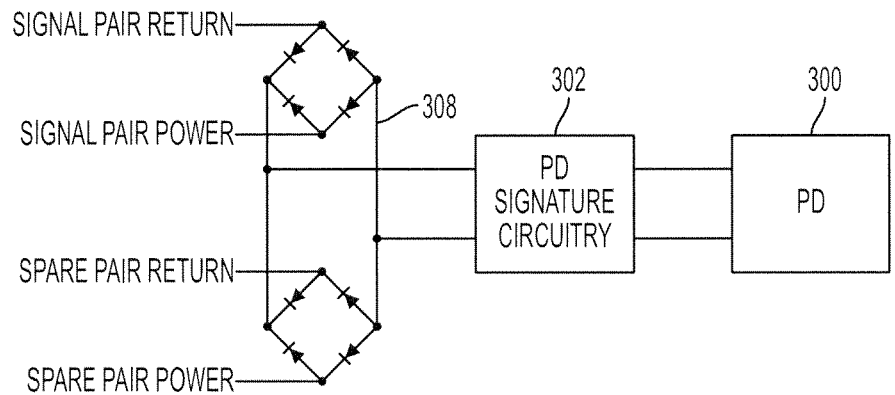
FIG. 6 illustrates a PD associated with single PD signature circuitry.
Figure 7:
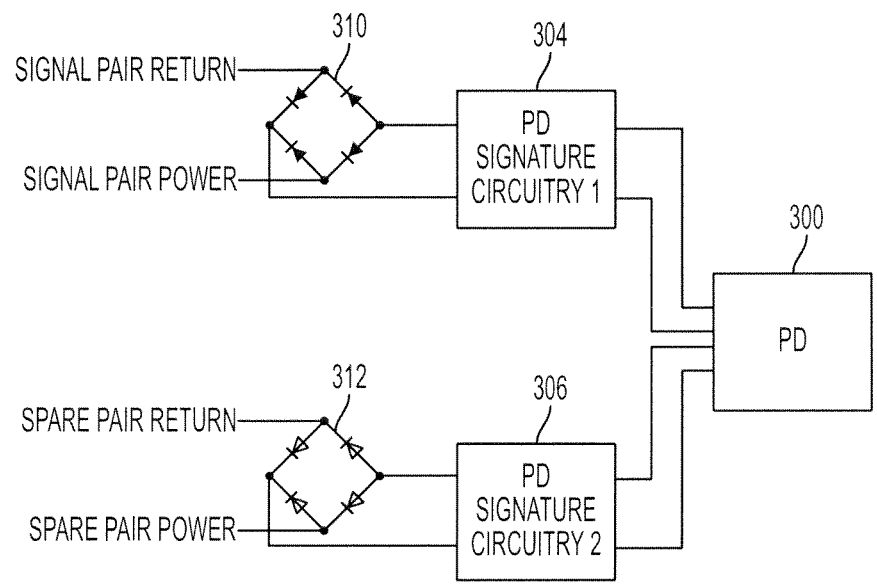
FIG. 7 illustrates a PD associated with a pair of PD signature circuitries.

For example, the switch control circuitry 260 in FIG. 5 may implement a switch control procedure to determine whether one or two PD signature circuits are present in the PD connected to the PSE circuitry 220 over four pairs of conductors in the Ethernet cable. As illustrated in FIGS. 6 and 7, a PD 300 connected to the PSE circuitry 220 over four pairs of conductors can be associated with a single PD signature circuitry 302 (FIG. 6) or with a pair of PD signature circuitries 304 and 306 (FIG. 7).

Each PD signature circuitry is configured to provide the PSE circuitry 220 with an IEEE PoE standard compliant detection signature. If during the detection test prescribed by the IEEE PoE standard, the PSE circuitry 220 detects a valid PD signature value, i.e. the signature value specified by the IEEE PoE standard, the PD 300 connected to the Ethernet cable is considered to be a valid PD and may be supplied with power.

The single PD signature circuitry 302 in FIG. 6 may be connected to two signal pairs and two spare pairs of the Ethernet cable over a standard PD diode network 308 including two diode bridges. By contrast, in the PD arrangement in FIG. 7, the PD signature circuitry 304 is connected to two signal pairs over a diode bridge 310, whereas the PD signature circuitry 306 is connected to two spare pairs over a diode bridge 320. A Cisco UPoE PD device is an example of the arrangement in FIG. 7.

Figure 2:
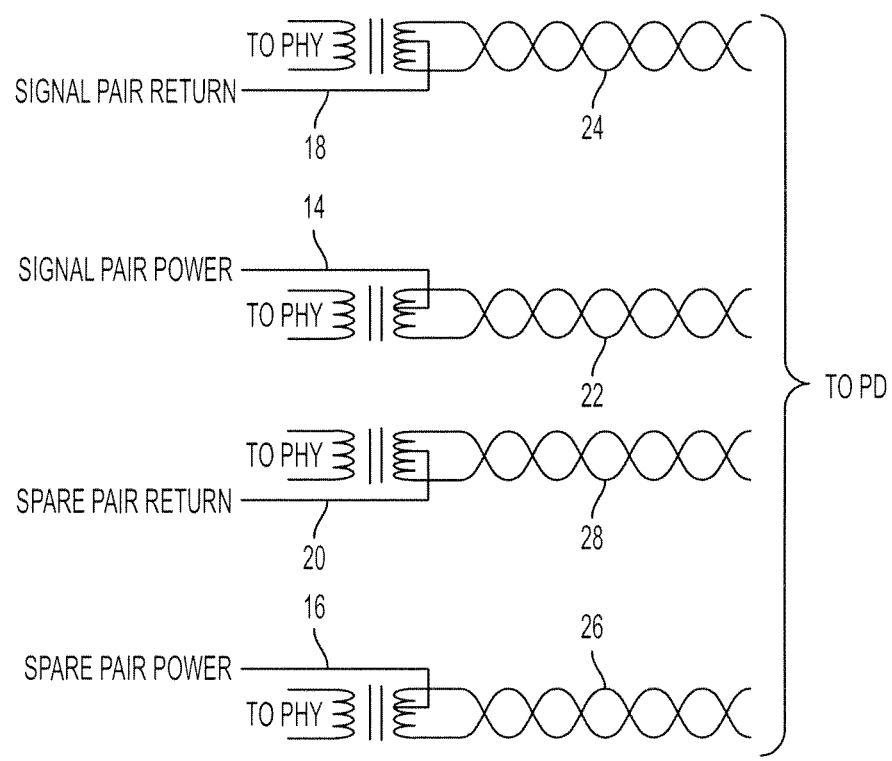
FIG. 2 shows connections of output PSE lines to twisted pairs of an Ethernet cable.
Figure 8:
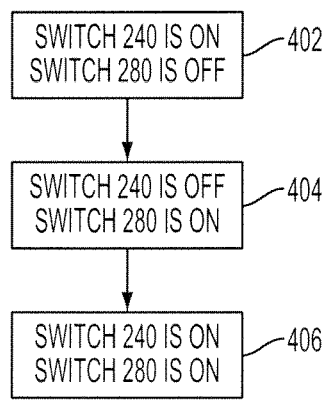
FIG. 8 illustrates an exemplary switch control procedure of the present disclosure.

The switch control circuitry 260 allows the PSE circuitry 220 to perform detection tests to detect the PD signature so as to determine whether the PD 300 is a valid PD having one or two signature circuits. As illustrated in FIG. 8, the PSE circuitry 220 may perform a sequence of detection tests 402, 404 and 406 to determine a detection signature of the PD 300 during each of the test. Before performing the first detection test 402, the switch control circuitry 260 turns the switch 240 on and turns the switch 280 off so as to enable the PSE circuitry 220 to detect the PD 300 only over the spare pairs 26 and 28 (FIG. 2). The second detection test 404 is performed when the switch 240 is turned off, and the switch 280 is turned off so as to detect the PD 300 only over the signal pairs 22 and 24. The third detection test 406 is performed when both switches 240 and 280 are turned on so as to detect the PD 300 over all four pairs 22, 24, 26 and 28.

A data processing circuit in the PSE circuitry 220 may analyze results of all 3 detection tests 402, 404 and 406 to determine when the PD 300 is a valid PD device. In particular, if the same valid PD signature value, e.g. 25 kOhm, is detected in each of the tests 402, 404 and 406, the PSE circuitry 220 can assume that it has detected a valid four-pair connection to a PD with a single signature circuit (as in the arrangement in FIG. 6).

If the first and second detection tests 402 and 404 detect the same valid PD signature value, e.g. 25 kOhm, and the third detection test 406 reports the PD signature value equal to the half of the PD signature value detected in the tests 402 and 404, e.g. 12.5 kOhm, the PSE circuitry 220 can assume that two independent signature circuits are detected, one of which is connected to the signal pairs of conductors, and the other—to the spare pairs of conductors. The two signature circuits connected in parallel create the 12.5 kOhm result of the third test 406.

These two signature circuits may be associated with a single valid PD 300 connected to the four pairs of conductors in the Ethernet cable (as in the arrangement in FIG. 7). Alternatively, the two independent signature circuits detected in the tests 402, 404 and 406 may be associated with a PD composed of two separate valid PD units, one of which is connected to the signal pairs, and the other—to the spare pairs.

If either the first or the second detection test reports an invalid PD signature, the third detection test may be skipped. In this case, the PSE circuitry 220 can assume that a valid PD is not connected to all four pairs of the Ethernet cable.

However, if the first detection test 402 detects a valid PD signature value, but the second detection test 404 reports an invalid signature value, the PSE signature circuit can assume that a valid PD is connected to the spare pairs of conductors, but not to the signal pairs. Similarly, if the first detection test 402 detects an invalid PD signature, but the second detection test 404 reports a valid PD signature value, the PSE circuitry 220 can assume that a valid PD is connected to the signal pairs of conductors, but not to the spare pairs.

Figure 1:
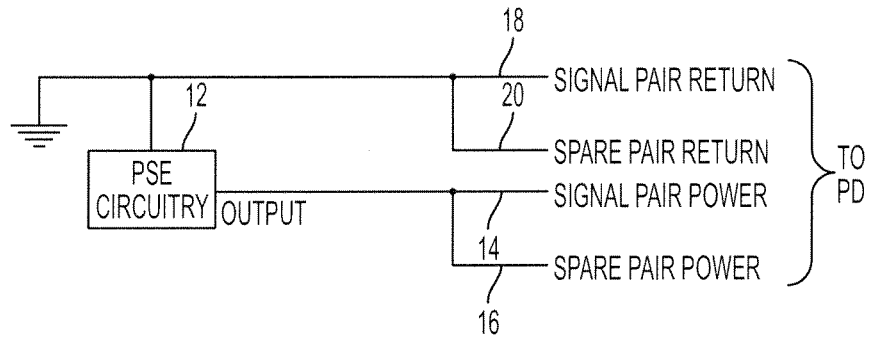
FIG. 1 illustrates a pairs-tied-together high power PoE system, such as the LTPoE++™ system.
Figure 3:
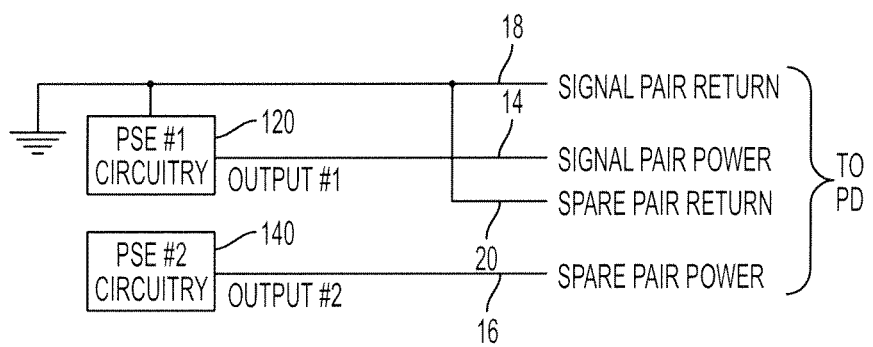
FIG. 3 illustrates a dual-PSE high power PoE system, such as the Cisco UPoE system.

The PoE system of the present disclosure can be configured as a fully IEEE-compliant PSE, or it can be configured to interoperate with either pairs-tied-together high power PoE systems, such as the LTPoE++™ system in FIG. 1, or dual-PSE high power PoE systems, such as the UPoE system in FIG. 3.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

What is claimed is:

1. A system for providing power to a powered device (PD) over a cable having four twisted pairs, comprising:
   Power Sourcing Equipment (PSE) circuitry,
   a first switch for coupling the PSE circuitry to two of the twisted pairs when turned on and for decoupling the PSE circuitry from the two twisted pairs when turned off, and
   a switch control circuit for turning the first switch off to enable the PSE circuitry to perform a prescribed operation in connection with the PD over only the other two twisted pairs, and for turning the first switch on to enable the PSE circuitry to perform the prescribed operation in connection with the PD over all four twisted pairs,
   wherein the switch control circuitry has a configuration that cause the following sequence:
   turns the first switch off;
   measures the resistance of the PD while the first switch is off;
   stores the resistance measurement;
   turns the first switch on;
   measures the resistance of the PD while the first switch is on; and
   compares the measured resistance of the PD while the first switch is on with the stored measured resistance of the PD while the first switch was off to determine the number of PD signature circuits the PD has.

2. The system of claim 1, wherein, when the first switch is turned off, the PSE circuitry is enabled to power the PD over only the other two twisted pairs, and, when the first switch is turned, the PSE circuitry is enabled to power the PD over all four twisted pairs.

3. The system of claim 1, wherein the PSE circuitry provides power over at least a pair of first, second, third and fourth power lines coupled to the first, second, third and fourth pairs of conductors, respectively.

4. The system of claim 3, wherein the first switch couples the PSE circuitry to one of the first, second, third and fourth power lines.

5. The system of claim 1, wherein the first switch is turned on after detecting the PD but before providing power to the PD, to enable the PD to perform detection of the PD over the other two twisted pairs, and provide power to the detected PD over all four twisted pairs.

6. The system of claim 1, wherein, when the first switch is turned off, the PD is enabled to provide power over only the other two twisted pairs, and, after providing power over the other two twisted pairs and the first switch is turned on, the PD is enabled to provide power over both all four twisted pairs.

7. The system of claim 1, further comprising a second switch for coupling the PSE circuitry to the other two twisted pairs.

8. The system of claim 7, wherein, when the first switch is turned on and the second switch is turned off, the PSE is enabled to detect the PD over only the two twisted pairs.

9. The system of claim 7, wherein, when the first switch is turned on and the second switch is turned off; the PSE is enabled to power the PD over only the two twisted pairs.

10. The system of claim 7, wherein, when both the first and second switches are turned on, the PSE is enabled to detect the PD over all four twisted pairs.

11. The system of claim 7, wherein, when both the first and second switches are turned on, the PSE is enabled to power the PD over both all four twisted pairs.

12. The system of claim 7, wherein the first switch and the second switch can be controlled to enable the PSE circuitry to perform a sequence of detection operations to distinguish between a PD associated with a single PD signature circuitry and a PD associated with a pair of PD signature circuitries.

13. The system of claim 7, wherein the first switch and the second switch can be controlled to enable the PSE circuitry to perform a sequence of detection operations to determine whether a valid PD is coupled to all four twisted pairs.

14. The system of claim 1 wherein the PSE circuitry includes detection and classification circuitry.

15. The system of claim 1 wherein the PSE circuitry includes switching and inrush control circuitry and is in series with the first switch.

16. The system of claim 1 wherein the PSE circuitry is directly connected to two of the twisted pairs.

* * * * *